| United States Patent [19] | [11] | 4,061,798 |
|---|---|---|
| Kanegae et al. | [45] | Dec. 6, 1977 |

[54] METHOD FOR PREPARING HARD BUTTERS FROM PALM OIL

[76] Inventors: Junji Kanegae, 38-90, Nishikanenoi, Showa-cho, Kitakatsushika, Tokyo; Tsugio Izumi, 3-302, Midejutaku, 280, Tsuruhara, Izumisano, Osaka; Akio Mandai, 22-8, Asahimachi, Izumiotsu, Osaka, all of Japan

[21] Appl. No.: 724,821

[22] Filed: Sept. 22, 1976

[51] Int. Cl.$^2$ .............................................. A23D 5/00
[52] U.S. Cl. ...................................... 426/607; 260/409
[58] Field of Search ................. 426/606, 607; 260/409

[56] References Cited

U.S. PATENT DOCUMENTS

| 2,942,984 | 6/1960 | Wissebach | 260/409 |
|---|---|---|---|
| 2,975,063 | 3/1961 | Paul et al. | 426/607 |
| 3,856,831 | 12/1974 | Tateishi et al. | 260/409 |
| 3,949,105 | 4/1976 | Wieske et al. | 426/607 |

*Primary Examiner*—Raymond N. Jones
*Assistant Examiner*—R. A. Yoncoskie
*Attorney, Agent, or Firm*—Hubbell, Cohen, Stiefel & Gross

[57] ABSTRACT

Hard butters, which are suitable replacements for cacao butter and which may be used for confectionary products without the occurrence of blooming, are obtained by hydrogenating a soft palm oil fraction having an iodine value of at least 55 with a conventional hydrogenation catalyst in the presence of methionine, whereby at least 40% of the glycerides are trans-isomers (calculated as trielaidine) and, optionally separating the middle-fraction of the hydrogenated product.

14 Claims, 2 Drawing Figures

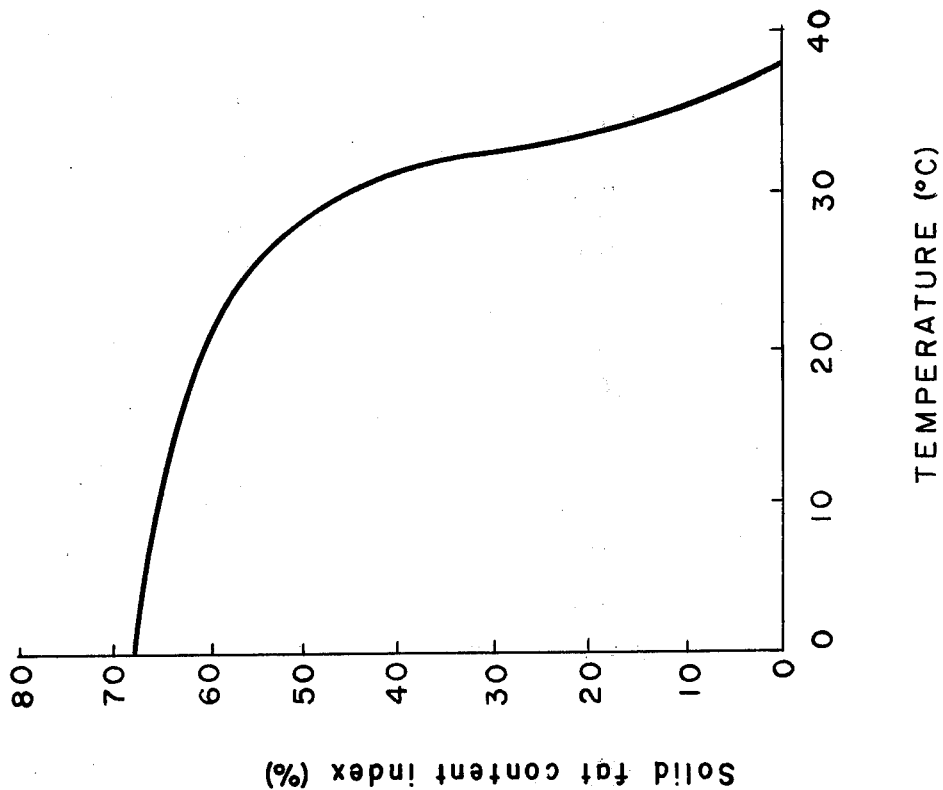
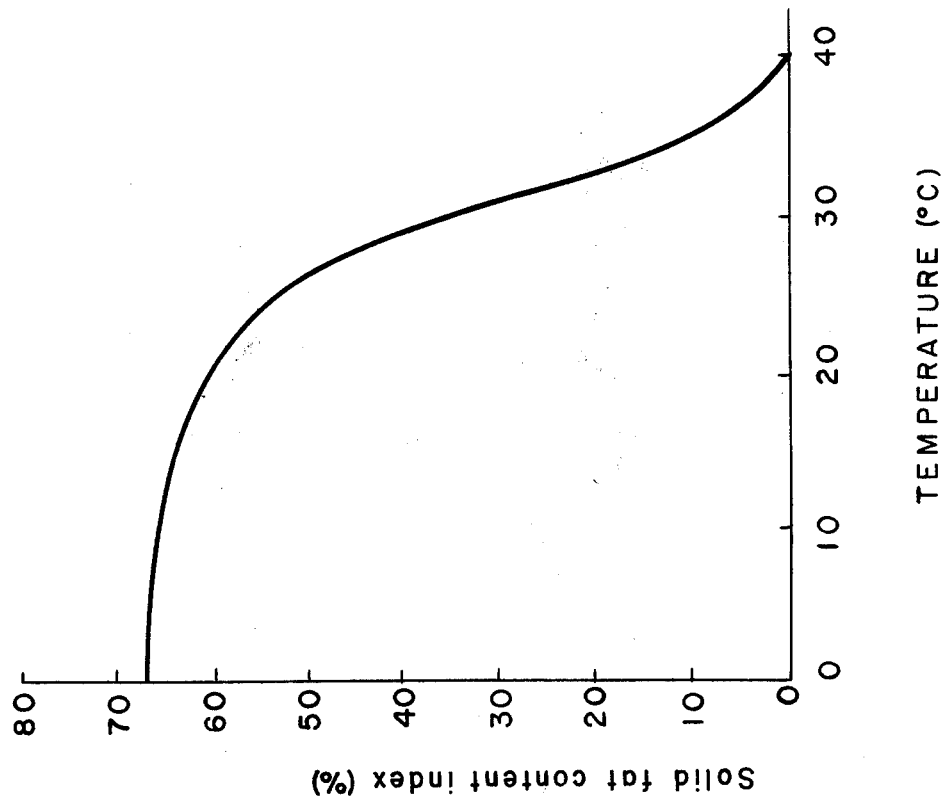

METHOD FOR PREPARING HARD BUTTERS FROM PALM OIL

BACKGROUND OF THE INVENTION

1. Field of the Invention

This invention relates to methods for preparing good hard butters from palm oil, which may be used as a replacement for cacao butter to a large extent in confectionary products such as chocolates, chocolate-flavored coatings and the like, without the occurrence of blooming even when the product is used without tempering.

2. The Prior Art

Hard butters are very important in the chocolate-making industry as a substitute for cacao butter, because while it is solid at room temperature, it melts evenly at body temperature, i.e., around 37° C. Heretofore, most hard butters have been made from natural fats having fatty acid compositions and orientation similar to those of cacao butter, such as shea butter or phulwara butter. However, these vegetable butters are relatively expensive because of the comparatively poor yields from the raw starting materials which grow wild and are not widely cultivated. Moreover, the starting materials for these vegetable butters are difficult to obtain because of unstable weather and political conditions in the countries to which they are indigenous. As a result, there has been an increasing demand for cheaper and more abundant substitutes for cacao butter other than the known vegetable butters noted above.

Palm oil, which is obtained from the fruit of the palmaean plant, *Elaeis guineensis Jacq.*, is one of the most abundant and cheap vegetable oils, because the plant is now being increasingly cultivated in Malaysia and Indonesia. In the past, it has been known to obtain hard butters from palm oil by fractionating the palm oil with a suitable solvent such as acetone, methyl ethylketone or hexane, or by collecting the mid-fraction of a hardened palm oil by solvent fractionation. Of these two known processes, the former is unacceptable because the yield of desired product is much too low when the fractionation is effected with sufficient precision so as to obtain a suitable product. On the other hand, if the fractionation is not carried out precisely enough, a large amount of high-melting glycerides in the oil unavoidably becomes mingled with the final product. When such a crude product is used in confectionaries, the undesirable phenomenon known as "blooming" occurs. The second of these two known processes is also unacceptable, because if the palm oil is preliminarily hydrogenated according to conventional techniques (with a nickel catalyst) and then subjected to a conventional solvent fractionation, it will form, as a by-product, so large an amount of the high-melting glycerides (which must be removed), that it becomes an uneconomical process for industrial purposes. Likewise, the hydrogenation of a highly unsaturated oil, such as cotton seed oil or soybean oil using an ordinary nickel catalyst will also give unsatisfactory results because of the high-melting glycerides which are inevitably by-produced in such process.

On the other hand, it has also been known that hard butters having a high trans-isomer content rarely cause blooming and thus may be used as a replacement for cacao butter. However, since the ordinary nickel catalyst is so low in the ability to isomerize the product, an oil having a high iodine value which is far different from palm oil must be used as the raw starting material, and even under special conditions, that is, under so-called "selective conditions" (i.e., low hydrogenation pressure and high catalyst concentration), it is impossible to avoid the by-production of the high melting-glycerides. In addition, other processes for bringing about the trans-isomerization of an oil or fat are also known, which processes, however, do not seem practical because deterioration of the treated oil occurs due to the isomerization catalysts generally used, such as selenium.

In order to avoid the disadvantages of the above-described prior art processes, there was developed a process which is described in U.S. Pat. No. 3,856,831 (owned by the unrecorded assignee hereof). Said U.S. patent describes a method for obtaining good hard butters by hydrogenating a fat or oil including palm oil having an iodine value within the range of 60 to 78 with the total content of linoleic and linolenic acids being less than 17 weight percent with a nickel catalyst poisoned with sulfur (6 to 21 parts of sulfur per 100 parts by weight of nickel). However, it should be noted that although this process was satisfactory for the most part at the time, there still remained some unresolved problems, in particular, in controlling the degree of catalyst poisoning. For different applications or uses, it is desirable to prepare different kinds of poisoned catalysts, that is, catalysts which are poisoned to different degrees. However, since the catalyst poisoning according to the process of U.S. Pat. No. 3,856,831 is effected by subjecting an active nickel metal catalyst to the action of a toxic gaseous sulfur compound (such as $H_2S$), it is practically impossible to effectively control the degree of poisoning using that process. The present invention provides improved processes for making hard butters, which overcomes the disadvantages of the prior art sulfur-poisoned catalyst processes. The present process uses a novel poisoning agent, namely methionine, as a result of which the above difficulties in controlling the degree of catalyst poisoning are completely avoided. Moreover, by using the present process, the danger inherent in using $H_2S$ as a catalyst poison is avoided. Finally, by using the present process, there is no danger of having a food product contaminated with $H_2S$.

In addition to the foregoing, the following patents are noted as being relevant prior art: U.S. Pat. Nos. 3,687,989; 2,972,541; 2,942,984; 2,468,799; British Pat. Nos. 1,219,245; 861,016; 859,769; Japanese patent publication No. 135,103/75.

In view of the above-noted problems and disadvantages which characterize the prior art processes, it is an object of this invention to provide processes for making hard butters from an inexpensive raw material without the need for a tempering step, which hard butters have remarkable resistance against fat blooming and which also have good melting properties that make the product especially useful as a cacao butter substitute.

Another object of the present invention is to provide processes for hydrogenating palm oil wherein the hydrogenation reaction is easily controllable whereby to prevent over-absorption of the hydrogen.

A further object of the invention is to provide means for poisoning the catalyst used in hydrogenating the palm oil in a manner that is safe, both for operators employed during the processing as well as the ultimate consumers of the products having the hard butters incorporated therein.

SUMMARY OF THE INVENTION

In accordance with the foregoing objects, the present invention provides processes for preparing hard butters from palm oil which comprises hydrogenating a soft palm oil fraction having an iodine value of at least 55 with a conventional hydrogenation catalyst in the presence of methionine so as to form at least 40%, based on the total glyceride content, of trans-isomers (mostly consisting of an elaidic acid moiety, calculated conveniently in terms of trielaidine). The hydrogenated product is further fractionated in the case where the starting palm oil has an iodine value from 55 to less than 60. When the starting palm oil has an iodine value of 60 or more, this further fractionation is optional.

BRIEF DESCRIPTION OF THE DRAWING

FIG. 1 and FIG. 2 respectively, are Solid Fat Content Index (SCI) curves for the hydrogenated products prepared according to Examples 1 and 3.

DETAILED DESCRIPTION OF THE INVENTION

The process according to the invention will now be described in more detail.

As noted above, the invention provides processes for preparing hard butters, wherein a raw palm oil is first fractionated with a suitable organic solvent, such as methyl ethyl ketone, n-hexane or acetone, to provide a lower melting fraction (hereinafter referred to as "soft palm oil") having an iodine value of at least 55. The thus obtained soft palm oil is then subjected to hydrogenation with a conventional hydrogenation catalyst of the type which has heretofore been used for hydrogenating oils or fats, such as an activated nickel catalyst, in the presence of methionine, so as to increase the trans-isomer content (calculated in terms of the amount of trielaidine relative to the total glyceride content) to over 40%. As the raw starting material there can be used either a raw, deacidified or bleached palm oil. According to the process, the starting oil is dissolved in a suitable organic solvent and the resulting solution is cooled and allowed to stand in order to precipitate out the undesirable higher melting fraction (consisting mainly of a mixture of high-melting glycerides). If the iodine value of the soft palm oil is below 55, the oleic acid content of the oil becomes so low, that after removal of the undesired higher melting fraction, the yield of the desired lower melting fraction (i.e., the soft palm oil) becomes so low as to be uneconomical. On the contrary, if the iodine value of the starting soft palm oil is between 55 and below 60, a preferred hard butter can be obtained through post-fractionation of the hydrogenated product; moreover, the omission of this post-fractionation step makes the resultant product unsuitable on account of its considerable softness which results from its lower SCI. Finally, if the iodine value of the starting soft palm oil is 60 or more, hard butters having desirable properties can usually be obtained irrespective of whether or not the post-fractionation step has been carried out. The following Table 1 gives the experimental data obtained in the Cone Penetration Test* when several hydrogenated products derived from three different soft palm oil fractions as well as cacao butter (for comparison purposes) were hydrogenated in accordance with the process of the invention, that is, with a conventional nickel catalyst and methionine.

*Described in A.O.C.S. Official Method Cc 16-60 using the apparatus described in ASTM Standard D-217-60T.

TABLE 1

| Raw Material | | | Hydrogenated Products* | | | |
|---|---|---|---|---|---|---|
| | I.V. | mp. (° C.) | Trans-isomer (%) | Degree of Penetration (mm) | | |
| | | | | 20° C. | 25° C. | 30° C. |
| Soft palm oil (a) | 70.2 | 35.2 | 63.8 | 0.5 | 0.7 | 4.5 |
| Soft palm oil (b) | 60.1 | 35.5 | 53.5 | 0.9 | 1.1 | 4.9 |
| Soft palm oil (c) | 51.3 | 36.1 | 40.8 | 2.3 | 3.8 | 7.2 |
| Cacao butter | — | — | — | 0.7 | 1.0 | 5.0 |

*The raw materials were hydrogenated under the following conditions: conventional nickel catalyst = 0.3 part per hundred parts of oil; methionine = 0.01 part per hundred parts of oil; hydrogenation temperature and pressure = 200° C. and 3 kg./cm² for five hours.

As can be clearly seen from the foregoing data, the hydrogenated products derived from soft palm oils (a) and (b) having an I.V. of 70.2 and 60.1, respectively, have similar hardness to that of cacao butter.

According to the process of the invention, the soft palm oil having an iodine value of at least 55, and from which the high melting fraction has been removed, is then hydrogenated with a conventional hydrogenation catalyst such as an activated nickel in the presence of methionine so as to give a hydrogenated fat or oil having a trans-isomer content of over 40%. The amount of the methionine used is preferably from 0.003 to 0.03% by weight, based on the soft palm oil. The methionine may be preliminarily admixed with the nickel catalyst or it may be separately added to the soft palm oil together with the catalyst. Irrespective of how the catalyst and methionine are added to the soft palm oil, the extent or degree of isomerization (to the trans-isomer) is remarkably enhanced by the joint use of such catalyst and methionine as compared with the extent of isomerization when the catalyst is used alone. Thus, when a soft palm oil of I.V. = 70 is hydrogenated with catalyst + methionine, the ratio Δ % trans-isomer/ΔI.V. is about 5. That is, there is a dramatic increase in the trans-isomer content per unit decrease in I.V. On the contrary, when the same soft palm oil is hydrogenated with catalyst alone, the ratio is only 1, indicating a very modest increase in trans-isomer content per unit decrease in I.V. Thus, conventional hydrogenation catalysts are not able to change soft palm oils to hardened oils or fats having high trans-isomer contents. Moreover, even though certain oils having high iodine values such as cotton seed oil or soybean oil can be converted to hardened oils or fats having high trans-isomer contents (about 30-50%), these products invariably need to be further fractionated to remove the large quantities of high-melting glycerides present therein, because if such high melting glycerides are not removed, the melting points of the hydrogenated products would be too high for confectionary use. Theoretically, of course, such other oils (cotton seed, soybean) could be used since a suitable middle melting fraction would be obtained after removing the high melting fraction. In practice, however, those other oils cannot be used because the high melting fraction accounts for such a large portion of the total hardened oil that after removal thereof, the final yield of the desired middle melting fraction would be so low as to be economically unfeasible.

Notwithstanding the fact that cotton seed or soybean oil per se are unsuitable for use in the process of the invention, it should be noted that small amounts (less than about 20%) of such highly unsaturated oils as rape seed oil or rice bran oil as well as cotton seed oil or soybean oil can be present in the soft palm oil which is to be hydrogenated, particularly if a slight deterioration in the ability of the hardened product to melt in the mouth, i.e., to melt at about 37° C. and a lowering of the hardness of the product at higher temperatures can be tolerated. In fact, a lowering of the hardness may even be advantageous for certain hard butters which are to be used in frigid zones. Clearly, it is difficult to state with precision exactly how much of these unsaturated oils may be incorporated into the soft palm oil because the amount will vary with the nature and kind of the unsaturated oils to be added, the iodine values of the soft palm oil to be hydrogenated and the hydrogenation conditions. All these factors being considered, it is believed that an amount of less than 20% by weight based on the total soft palm oil is permissible. The data given below show the melting point and S.C.I. values of a hardened product which was prepared by hydrogenating a mixture consisting of 15% soybean oil (I.V. 130.4) and 85% soft palm oil (I.V. = 67.4) at a hydrogen pressure of 1 kg./cm$^2$ at 180°-200° C. for 240 minutes in the presence of 0.19% activated nickel and 0.005% methionine.

|  | Temp. | S.C.I. |
|---|---|---|
|  | 10° C. | 62.3 |
| melting point of | 20° C. | 59.5 |
| hydrogenated product | 30° C. | 28.7 |
| 36.9 C. | 35° C. | 7.0 |
|  | 40° C. | 0.0 |

Thus, a suitable product can be obtained from a soft palm oil which contains 15% of a highly unsaturated soybean oil.

As described above, hydrogenation according to the process of the invention is carried out by using a conventional hydrogenation catalyst such as an activated nickel in the presence of methionine at a temperature of 160°-220° C. and a hydrogen pressure (gauge) of 1-10 kg./cm$^2$. The amounts of the nickel catalyst and methionine to be used are respectively, 0.1-3.0% and 0.003-0.03% by weight based on the weight of the soft palm oil. Moreover, one may use cystine or cysteine instead of the methionine, although methionine is presently preferred. As used herein, the term "methionine" is intended to include equivalents thereof such as dl-methionine, d-methionine, methionine sulfoxide, methylsulfonium methionine, β-methionine and functional derivatives thereof such as salts, esters, ethers and N-acyl derivatives as well as the naturally occurring l-methionine.

The hydrogenation will stop automatically when the trans-isomer content reaches a maximum level which is determined by the ratio of the hydrogenation catalyst to the methionine. This is a very important characteristic of the invention inasmuch as it effectively prevents the over-hydrogenation which has been a problem in prior oil or fat hardening processes.

The trans-isomer content of the hardened product should be at least 40% and preferably 50% or more of the total glycerides (calculated as trielaidine, measured according to "A.O.C.S. Tentative Method" Cd. 14-61). If the trans-isomer content is below 40%, the ultimate yield of hard butter after the further fractionation step by which the desired hard butter is obtained will be too low.

Alternatively, if the trans-isomer content is between 40% and 50%, a good hard butter is obtained in satisfactory yield after the fractionation. In particular, if the trans-isomer content is over 45%, a superior hard butter (as shown in FIG. 2) is obtained in a yield of more than 50% based on the starting soft palm oil.

The fractionation of the hydrogenated soft palm oil whereby to obtain the desired hard butter is effected with a suitable organic solvent such as methyl ethyl ketone, acetone, hexane, petroleum ether, ethyl acetate, and the like. The hardened product is dissolved in the solvent, either warm or hot, and cooled to precipitate out a first crystalline fraction (the high-melting fraction). This high-melting fraction is removed by filtration or centrifugation and then the filtrate or supernatant (as the case may be) is collected and further cooled to precipitate out a second crystalline fraction (the mid-fraction). This mid-fraction comprising the desired hard butter is then collected and dried.

The fractionating temperatures will vary depending on the kind of solvent used and the desired characteristics of the hard butter. However, generally, the two-step fractionation is carried out first at a temperature of 15°-25° C. to precipitate out the high-melting fraction, and then at 5°-10° C. to precipitate out the desired mid-fraction. The process according to the invention has the following unexpected advantages as compared with the process of U.S. Pat. No. 3,856,831:

1. Increased yield; good hard butters having more than 50% of trans-isomer can be obtained in a yield of over 50% based on a raw soft palm oil of I.V. 60.

2. Improved workability; control of the extent of poisoning of the catalyst is much easier than in said patent since methionine is not a gaseous substance but rather is a solid which is stable and can be weighed precisely.

3. Improvement from a hygienic aspect; methionine is a harmless and stable substance and is quite different from the toxic gaseous suflur compounds which are used in said patent. This feature is important not only in terms of production personnel, but also the consuming public.

4. Reproducibility of the product; in connection with (2) above, a uniform product can be obtained regardless of fluctuations in the quality of the starting palm oil because the balance between the trans-isomer content and the saturated fatty acid content in the hardened product can be readily controlled by adjusting the amount of methionine to be added relative to the catalyst. Therefore, it is possible to prepare many kinds of catalysts which differ in the degree of poisoning; moreover, it is possible to reduce the reaction time as compared with the previous catalyst.

5. Improved color of the products; the color of the hardened product according to the invention is much better than that of the prior art as follows:

TABLE 2

| Samples | Color* | |
|---|---|---|
| Example V of U.S. Pat. No. 3,856,831 | red | 0.8 |

TABLE 2-continued

| Samples | Color* | |
|---|---|---|
| Example I of the present invention | red | 0.6 |

*Measured using a Lovibond chromometer with a 5¼ inch cell

6. Improved in taste and flavor; the generation of off flavor and unpleasant taste can be prevented to a large extent by the present invention as follows:

TABLE 3

| Samples* | Days required for generating off flavor and unpleasant (unpalatable) taste |
|---|---|
| Example V of U.S. Pat. No. 3,856,831 | 10 |
| Example I of the present invention | 13 |

*Each sample was placed in a half-filled bottle, tightly closed and kept at 60° C.

7. Compatibility; other conventional hydrogenation catalysts can be freely used in the present process. For example, any known selective hydrogenation catalyst which has been used for the reduction of polyenes to monoenes, such as copper or copper/chrome may be used jointly with the catalyst according to the invention.

DESCRIPTION OF THE PREFERRED EMBODIMENTS

The process of the present invention will now be further described by the following examples which are intended to merely illustrate and not to limit the invention.

EXAMPLE 1

A purified palm oil was dissolved in warm 95% methyl ethylketone to form a 10% solution therein. This solution was then cooled to −5° C. to form a crystalline precipitate which was then collected to yield a soft palm oil having an I.V. of 70.2. To this soft palm oil, there were then added 0.3% by weight of a conventional nickel catalyst[1] and 0.01% of dl-methionine. The soft palm oil was then hydrogenated at 200° C. under a hydrogen pressure of 3 kg./cm²(gauge) until the trans-isomer content had reached 60% (this procedure took about 5 hours). The resulting hardened product was then refined according to conventional purification techniques to give a hard butter having a Solid Fat Content Index as shown in FIG. 1.
(1) The nickel catalyst consisted of 18% by weight of nickel embedded on diatomaceous earth. This catalyst was used in all of the succeeding examples.

EXAMPLE 2

A different palm oil than that which was used in Example 1 was fractionated as in Example 1 to obtain a soft palm oil having an I.V. of 60.1. This soft palm oil was then hydrogenated as in Example 1, except that 0.15% of the nickel catalyst and 0.003% of dl-methionine were used. After the fractionation, a good, hard butter was obtained.

EXAMPLE 3

The same palm oil as was used in Example 1 was dissolved in methyl ethyl ketone and cooled to −5° C., after which it was filtered to remove a high melting portion which precipitated out. From the resulting filtrate, the solvent was distilled off to give a soft palm oil having an I.V. of 70. To this soft palm oil, there were added 0.3% of the nickel catalyst and 0.01% of dl-methionine. The mixture was then hydrogenated under a hydrogen pressure 3 kg./cm² (gauge) at 200° C. for 1.5 hours to give a hardened product having a trans-isomer content of 60%. This product was then dissolved in 95% methyl ethylketone to form a 20% oil solution which was then cooled to 21° C. to precipitate out a high-melting portion. The filtrate was then further cooled to −8° C. to form a crystalline precipitate which was then collected and dried whereby to obtain a mid-fraction having a melting point of 35.4° C., the melting characteristics of this product being shown in FIG. 2. The yield was 70% based on the starting soft palm oil.

EXAMPLE 4

The soft palm oil obtained according to the procedure of Example 1 was hardened following the procedure of Example 1, except that the amount of the nickel catalyst was 0.2% by weight and the amount of dl-methionine was 0.004% by weight. There was obtained a hardened oil containing 50% of the trans-isomer. This hardened oil was then dissolved in 98% acetone to give a 20% acetone solution thereof. Thereafter, the acetone solution was cooled to 20° C. and the thus precipitated high-melting portion was removed through filtration. The resulting filtrate was then cooled to −6° C., and the thereby precipitated desired mid-fraction was collected. This was followed by evaporation of the solvent to give a good hard butter possessing good melting properties. The yield was 55% based on the weight of the starting soft palm oil.

EXAMPLE 5 (control)

A soybean oil was hardened with 0.3% of the nickel catalyst at a hydrogen pressure of 3 kg./cm² (gauge) and 200° C. For comparative purposes, an experiment according to Example 3 was repeated. The properties of the raw (starting) oils and the respective hardened and fractionated oils are given in the following Table 4.

TABLE 4

| | Hardened Oils | | | | | | |
|---|---|---|---|---|---|---|---|
| | Before Fractionation | | | After Fractionation | | | |
| Raw Oils (I.V.) | Trans-isomer (%) | I.V. | r.p.* (° C.) | Fraction | Yield (%) | I.V. | r.p.* (° C.) |
| Soybean oil (133.2) | 57.5 | 57.8 | 51.2 | high-melting | 31.5 | 38.6 | |
| | | | | mid-melting | 39.7 | 59.5 | 36.0 |
| | | | | low-melting | 28.8 | 77.6 | |
| Soft palm oil (70.0) | 60.4 | 56.3 | 35.5 | high-melting | 8.5 | 41.1 | |
| | | | | mid-melting | 68.3 | 55.4 | 35.4 |
| | | | | low- | 23.4 | 66.8 | |

TABLE 4-continued

| Raw Oils (I.V.) | Hardened Oils | | | | | | |
|---|---|---|---|---|---|---|---|
| | Before Fractionation | | | After Fractionation | | | |
| | Trans-isomer (%) | I.V. | r.p.* (° C.) | Fraction | Yield (%) | I.V. | r.p.* (° C.) |
| | | | | melting | | | |

*r.p. = rising point.

As can be clearly seen from the data in the above Table, in both hardened oils (before fractionation), the iodine value and trans-isomer content are quite similar irrespective of the nature of the original oil, but the rising points are quite different. This difference in rising point accounts for the differences in the yields of the respective middle melting fractions. Thus, according to the present invention, a remarkably high yield can be obtained from palm oil as compared with that from soybean oil when both are subjected to ordinary hydrogenation.

EXAMPLE 6

A soft palm oil having an I.V. of 64.2 was hydrogenated at a hydrogen pressure of 1 kg./cm² with different amounts of catalyst and dl-methionine, wherein the hydrogenation temperatures were raised from 180° C. at first to 200° C. finally. The obtained data are given in the following Table 5.

TABLE 5

| Experiment No. | Nickel Catalyst % based on raw oil | Methionine % based on raw oil | Reaction Time (minutes) | Hydrogenated Products (non-fractionated) | | | |
|---|---|---|---|---|---|---|---|
| | | | | I.V. | sp. (° C.) | rp. (° C.) | Trans-isomer (%) |
| 1 | 0.15 | 0.005 | 300 | 53.2 | 38.3 | 39.5 | 63.3 |
| 2 | 0.15 | 0.005 | 180 | 54.4 | 33.1 | 33.1 | 45.9 |
| 3 | 0.30 | 0.01 | 220 | 54.0 | 34.2 | 36.3 | 40.2 |
| 4 | 0.30 | 0.012 | 140 | 52.8 | 35.5 | 37.3 | 42.4 |
| 5 | 0.30 | 0.012 | 360 | 54.1 | 37.2 | 38.2 | 64.0 |
| 6 | 0.30 | 0.015 | 220 | 54.5 | 34.7 | 37.0 | 56.8 |
| 8 | 0.60 | 0.03 | 360 | 54.2 | 37.8 | 38.8 | 68.5 |
| 9 | 0.60 | 0.03 | 300 | 55.7 | 35.9 | 37.4 | 59.1 |

EXAMPLE 7

An industrial scale run was carried out with 8,042 liters of a soft palm oil having an I.V. of 66.8 together with 10.5 kg. of an activated nickel catalyst and 0.7 kg. of dl-methionine at a hydrogen pressure of 1 kg./cm² and a temperature of 200° C. for 360 minutes. The catalyst and methionine were preliminarily dispersed into a small portion of the raw palm oil to form a 7% suspension which was then added into the remaining oil. The introduction of hydrogen was started when the inner temperature of the reaction vessel (7 ton capacity) had reached 170° C. The heating was controlled so that the inner temperature did not exceed 200° C. During the course of the reaction, 0.5 kg. samples were taken at 30 minute intervals at first and then at 60 minutes for analysis. The data obtained are given in the following Table 6.

TABLE 6

| Hydrogenation | | Hydrogenated Products | | |
|---|---|---|---|---|
| Time (minutes) | Temperature (° C.) | I.V. | rp. (° C.) | Trans-isomer (%) |
| 0 | 170 | 66.8 | — | — |
| 60 | 188 | 57.0 | 33.7 | 30.6 |
| 90 | 188 | 57.0 | — | 33.8 |
| 120 | 189 | 56.2 | 34.7 | 35.6 |
| 150 | 190 | 56.1 | — | — |
| 180 | 192 | 55.8 | 35.4 | 42.5 |
| 240 | 193 | 55.6 | 37.0 | 49.5 |
| 300 | 194 | 54.5 | 38.6 | 58.8 |
| 360 | 195 | 54.1 | 39.0 | 65.9 |

After the hydrogenation was complete (at the end of the reaction, the absorption of hydrogen almost completely stopped), the reaction mixture was filtered and the filtrate was dissolved in 95% methyl ethylketone to form a 20% oil solution therein. This solution was then cooled to 21°-22° C. and allowed to stand for 60 minutes with slow stirring until the high-melting glycerides had precipitated out. The filtrate from which the high-melting glycerides had been removed was further cooled to −8° C. and allowed to stand for 90 minutes, whereby there was precipitated a mid-fraction which was then collected. This mid-fraction was then bleached and deodorized according to conventional techniques after the solvent had been removed. The results of this fractionation are given in the following Table 7.

TABLE 7

| Fractions | I.V. | Yield (%) | r.p. (° C.) | Trans-isomer (%) |
|---|---|---|---|---|
| High-melting | 38.2 | 14.5 | — | — |
| Mid-melting | 52.6 | 63.5 | 36.5 | 67.0 |
| Low-melting | 69.5 | 22.0 | — | — |

EXAMPLE 8

Two milk chocolate samples were prepared in accordance with the following recipes.

| Ingredient | Recipe A | Recipe B |
|---|---|---|
| Cocoa liquor | 15 parts | 15 parts |
| Whole milk powder | 25 parts | 25 parts |
| Pulverized sugar | 38 parts | 38 parts |
| Fat | 22 parts (cacao butter) | 19 parts (cacao butter) 3 parts (substitute)* |
| Lecithin | 0.5 part | 0.5 part |

*"Substitute" means a hydrogenated soft palm oil prepared according to Example 1.

The ingredients of recipes A and B were separately admixed with each other according to the conventional manner and the mixtures were further homogenized through refining rolls. After conching for 5 hours, both mixtures were subjected to tempering and molding processes, and then cooled. The thus obtained chocolate samples were then allowed to stand for a week at 17°–20° C. in order to allow the fats to change into a more stable crystalline form for the subsequent test. Then the chocolate samples were put into a thermostatically controlled heating apparatus and subjected to the following heat treatments:

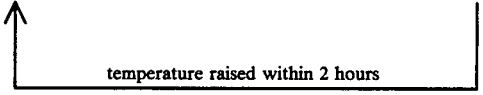

This heat cycle was repeated until blooming could be seen. In sample A, blooming occurred after 5-6 cycles of the heating test, while sample B did not show any appreciable blooming or decrease in gloss even after 15 cycles of the heating test.

Variations and modifications can, of course, be made without departing from the spirit and scope of the invention.

Having thus described our invention what we desire to secure by Letters Patent and hereby claim is:

1. A process for preparing a hard butter from palm oil, said method comprising hydrogenating a soft palm oil fraction having an iodine value of at least 55 with a conventional hydrogenation catalyst in the presence of a catalytically effective amount of methionine to thereby form a hardened product containing at least 40% of trans-isomers.

2. A process according to claim 1, wherein the iodine value of the starting soft palm oil fraction is less than 60, said process further comprising subjecting the hardened product to a further fractionation to remove high-melting glycerides therefrom.

3. A process according to claim 2, wherein the further fractionation is a solvent fractionation.

4. A process according to claim 3, wherein the solvent fractionation is effected with methyl ethyl ketone, acetone, hexane, petroleum ether or ethyl acetate.

5. A process according to claim 3, wherein the solvent fractionation is effected in two stages; a first stage at 15°–25° C. to precipitate out undersirable high-melting glycerides and a second stage at 5°–10° C. to precipitate out the desired hard butter.

6. A process according to claim 1, wherein the iodine value of the soft palm oil fraction is at least 60.

7. A process according to claim 1, wherein the hydrogenation catalyst is an activated nickel catalyst.

8. A process according to claim 7, wherein the activated nickel catalyst comprises 18% nickel embedded in diatomaceous earth.

9. A process according to claim 1, wherein the amount of catalyst and methionine respectively, are 0.1–3.0% and 0.003–0.03% by weight based on the weight of the soft palm oil fraction.

10. A process according to claim 1, wherein the hydrogenation is effected at 160° to 220° C. and a hydrogen pressure (gauge) of 1 to 10 kg./cm$^2$.

11. A process according to claim 1, wherein the methionine is selected from the group consisting of l-methionine, d-methionine, dl-methionine, methionine sulfoxide, methyl sulfonium methionine, $\beta$-methionine and functional derivatives, including salts, esters, ethers and N-acyl derivatives thereof.

12. A process according to claim 1, wherein the soft palm oil fraction has an iodine value ranging from at least 55 to about 75.

13. A process according to claim 1, wherein the soft palm oil fraction contains up to about 20% by weight of a highly unsaturated oil.

14. A process according to claim 13, wherein the highly unsaturated oil is rape seed oil, rice bran oil, cotton seed oil or soybean oil.

UNITED STATES PATENT OFFICE
CERTIFICATE OF CORRECTION

Sheet 1 of 1

Patent No. 4,061,798        Dated December 6, 1977

Inventor(s) JUNJI KANEGAE et al

It is certified that error appears in the above-identified patent and that said Letters Patent are hereby corrected as shown below:

Column 6, line 46: "suflur" should read -- sulfur --.

Signed and Sealed this

Fourth Day of July 1978

[SEAL]

Attest:

RUTH C. MASON
Attesting Officer

DONALD W. BANNER
Commissioner of Patents and Trademarks